(12) United States Patent
Vyorykka et al.

(10) Patent No.: US 12,577,427 B2
(45) Date of Patent: Mar. 17, 2026

(54) AQUEOUS ACRYLIC TEXTURED LAYER FORMING COMPOSITIONS USEFUL AS TOP COATS FOR SYNTHETIC SPORT SURFACES

(71) Applicants: Dow Global Technologies LLC, Midland, MI (US); Dow Silicones Corporation, Midland, MI (US)

(72) Inventors: Jouko Vyorykka, Waedenswil (CH); Sophie Hauswalt-Grolieres, Erstein (FR); Adrian J. Birch, Kempraten-Jona (CH); Robert Baumann, Rueschlikon (CH); Jean-Paul Lecomte, Brussels (BE)

(73) Assignees: DOW GLOBAL TECHNOLOGIES LLC, Midland, MI (US); DOW SILICONES CORPORATION, Midland, MI (US)

( * ) Notice: Subject to any disclaimer, the term of this patent is extended or adjusted under 35 U.S.C. 154(b) by 532 days.

(21) Appl. No.: 17/921,725

(22) PCT Filed: Jul. 23, 2021

(86) PCT No.: PCT/US2021/042862
§ 371 (c)(1),
(2) Date: Oct. 27, 2022

(87) PCT Pub. No.: WO2022/026300
PCT Pub. Date: Feb. 3, 2022

(65) Prior Publication Data
US 2023/0167330 A1 Jun. 1, 2023

(30) Foreign Application Priority Data
Jul. 30, 2020 (EP) .................................... 20305877

(51) Int. Cl.
*C09D 133/08* (2006.01)
(52) U.S. Cl.
CPC .................................. *C09D 133/08* (2013.01)

(58) Field of Classification Search
None
See application file for complete search history.

(56) References Cited

U.S. PATENT DOCUMENTS

| | | | |
|---|---|---|---|
| 6,395,827 B1 * | 5/2002 | Pears | C08G 18/6254 |
| | | | 524/832 |
| 2019/0153236 A1 * | 5/2019 | Li | C08F 220/14 |

FOREIGN PATENT DOCUMENTS

| | | |
|---|---|---|
| WO | 201610193 A1 | 1/2016 |
| WO | 2017185332 A1 | 11/2017 |

OTHER PUBLICATIONS

Vansant, E.F. et al.; Studies in Surface Science and Catalysis, 1995, vol. 93, p. 59-77.*
Eastman; Texanol Product Data Sheet, 2013, p. 1-3.*
Brandeurup, Polymer Handbook, 1999, vol. 1, p. 277.
Fox, Bull. Am. Physics Soc., 1956, vol. 1, No. 3, p. 123.

* cited by examiner

*Primary Examiner* — Robert S Jones, Jr.
*Assistant Examiner* — Christiaan Roelofse

(57) ABSTRACT

The present invention provides two-component aqueous textured layer forming compositions useful for forming flexible top coat layers for sports surfaces. The compositions comprise vulcanized or crosslinked rubber granules, for example, EPDM rubber, a soft:hard acrylic emulsion copolymer blend in a solids weight ratio to vulcanized or crosslinked rubber granule solids that ranges from less than 1:4 to 1:9, a polyalkylene oxide rheology modifier, one or more high boiling alcohols and, as a separate component, an aqueous dispersion of an aliphatic polyisocyanate as well as an epoxy silane. The vulcanized or crosslinked rubber granules may have a sieve particle size of 8 mm or less. The inventive top coat layers have enhanced tensile strength and elongation as well as improved pot life and color stability.

10 Claims, No Drawings

AQUEOUS ACRYLIC TEXTURED LAYER FORMING COMPOSITIONS USEFUL AS TOP COATS FOR SYNTHETIC SPORT SURFACES

FIELD OF THE INVENTION

The present invention relates to acrylic aqueous textured layer forming compositions useful in forming textured top coat layers on sport surfaces. More particularly, it relates to two-component acrylic aqueous compositions comprising, as one component, an acrylic emulsion polymer blend of a soft emulsion polymer and a hard emulsion polymer, rubber granules, a polyalkylene oxide rheology modifier, and a high boiling alcohol, and, as the other component, a water-dispersible polyisocyanate, as well as to and methods for using the compositions to make multilayer sport surfaces, and to the multilayer sport surfaces made thereby.

BACKGROUND OF THE INVENTION

Synthetic sport surfaces are widely used as athletic running tracks, school sport surfaces, tennis courts and play grounds. The sport surfaces may comprise layers of rubber granules bound together by thermoset polymers like polyurethanes (PU). These sport surfaces may be formed in multiple layers, for example, two or three layers, on top of a durable cement, concrete, tamped stone or asphalt base: A primer layer which improves adhesion to the cement, concrete, tamped stone or asphalt base substrate or base; a base layer or cushioning layer comprising an elastomeric composite, such as an aromatic polycarbamate containing polyurethane matrix from an aromatic polyurethane prepolymer, having dispersed therein rubber granules; and a top coat layer that provides friction and additional cushioning, as well as weatherability and durability, such as, for example, ultraviolet (UV) stability and color retention. The layers of the sport surface may be applied to the base using conventional paving or screening machines or troweling equipment, such as, by hand.

The same equipment may be used to form all layers to make application easier. For example, PU compositions may be used to form each layer as the binder. However, the use of a PU composition as a top coat layer for sport surfaces has several disadvantages. Aromatic isocyanates are not UV stable and may cause a color change over time. Aliphatic isocyanates do not have this disadvantage. However, they are less reactive and result in lower physical properties World Intellectual Property Organization (WIPO) publication no. WO 2017/185332A1, to Dow Global Technologies LLC discloses an acrylic multilayer system for sport flooring comprising an acrylic top coat layer forming composition that is preferably sprayed. However, the physical properties, such as elongation percent and tensile strength of top coat layers formed from the acrylic composition could be improved. In addition, the viscosity of the acrylic coating composition was increased using conventional thickeners to prevent its segregation from the rubber granules. However, the resulting aqueous coating composition fails to adhere suitably to the rubber granules under shear and during mixing and application.

The present inventors have endeavored to solve the problem of providing an aqueous composition for making a textured top coat layer for sport surfaces that provides improved mechanical properties in a UV stable, weatherable top coat layer.

SUMMARY OF THE INVENTION

In accordance with the present invention, two-component aqueous textured layer forming compositions comprise:

a first component of (i) an acrylic emulsion copolymer blend of (a) a first acrylic emulsion copolymer A having a calculated glass transition temperature (calculated Tg) of from −60 to −5° C. and, (b) a second acrylic emulsion copolymer B having a calculated Tg of from 15 to 60° C. in a solids weight ratio of copolymer A:copolymer B of from 25:75 to 90:10, or, preferably, from 30:70 to 80:20, (ii) vulcanized or crosslinked rubber granules, preferably, ethylene propylene diene monomer (EPDM) rubber or recycled rubber, in an amount wherein a solids weight ratio of the acrylic emulsion copolymer blend:vulcanized or crosslinked rubber granules ranges from less than 1:4 to 1:9, or, preferably, from 1:4.5 to 1:8; (iii) one or more polyalkylene oxide rheology modifier having a viscosity average molecular weight of from 400,000 to 5,000,000, or, preferably, from 480,000 to 2,500,000, such as a polyethylene oxide having a viscosity average molecular weight of from 400,000 to 5,000,000 or, preferably, from 480,000 to 2,500,000; and (iv) one or more high boiling alcohols having a normal boiling point of from 170 to 315° C., or, preferably, from 180 to 300° C., and, further, having a formula MW of 100 to 250, such as from 130 to 250; and, as a second component, (v) a crosslinking agent comprising both a water-dispersible polyisocyanate composition and an epoxy silane, preferably, wherein the polyisocyanate is an aliphatic water-dispersible polyisocyanate. The solids weight ratio of the water-dispersible isocyanate composition to the epoxy silane may range from 0.4:1 to 5:1, or, preferably, from 0.6:1 to 2.5:1. Suitable amounts of the (iii) one or more polyalkylene oxide rheology modifier may range from 0.1 to 0.5 wt. %, or, preferably, from 0.1 to 0.4 wt. %, based on the total weight of the acrylic emulsion copolymer blend. Suitable amounts of the (iv) one or more high boiling alcohols may range from 0.5 to 10 wt. %, or, preferably, from 0.5 to 7 wt. %, based on the total weight of the acrylic emulsion copolymer blend. The amount of the crosslinking agent may range from 1 to 10 wt. %, or, from 1 to 8 wt. %, or, preferably, from 2 to 6 wt. %, based on the total solids weight of the acrylic emulsion copolymer blend.

The (i) acrylic emulsion copolymer blend in accordance with the aqueous textured layer forming compositions of the present invention may comprise, as the first acrylic emulsion copolymer A, a copolymer of, in copolymerized form, one or more acrylic ester monomers chosen from methyl acrylate, ethyl acrylate, butyl acrylate, ethylhexyl acrylate, ethylhexyl methacrylate, a fatty alkyl (meth)acrylate, or mixtures thereof with, in copolymerized form, one or more $C_1$ to $C_8$ alkyl (meth)acrylates, preferably, methyl methacrylate. The first acrylic emulsion copolymer A may further comprise, in copolymerized form, up to 5 wt. %, or, preferably, from 0.1 to 2 wt. %, based on the total weight of monomers used to make the copolymer, of an ethylenically unsaturated carboxylic acid group containing monomer or its salt, such as acrylic, or methacrylic acid, or a carboxylic amide group containing monomer or its salt, such as (meth)acrylamide, or, preferably, an ethylenically unsaturated carboxylic acid group containing monomer or its salt. In the (i) acrylic emulsion copolymer blend in accordance with the present invention, the second acrylic emulsion copolymer B may comprise a copolymer of, in copolymerized form, one or more $C_1$ to $C_8$ alkyl methacrylates, preferably, methyl methacrylate, or of one or more $C_5$ to $C_{12}$ alkyl acrylates or cycloalkyl acrylates, such as isobornyl acrylate or cyclohexyl acrylate, with, in copolymerized form, one or more additional acrylic or vinyl monomers, such as those chosen from alkyl (meth)acrylates, (meth)acrylonitriles, allyl group containing monomers, arylenes or mixtures thereof. The second acrylic emulsion copolymer B may further comprise up to 5 wt. %, or, preferably, from 0.1 to 2 wt. %, based on the total weight of monomers used to make the copolymer, of, in copolymerized form, an ethylenically unsaturated carboxylic acid group containing monomer or its salt, such as acrylic, or methacrylic acid, or a carboxylic amide group containing monomer or its salt, such as (meth)acrylamide, preferably, an ethylenically unsaturated carboxylic acid group containing monomer or its salt. The first or second acrylic emulsion copolymers, A or B, may further comprise, in copolymerized form, up to 3 wt. % or, preferably, from 0.05 to 2 wt. %, based on the total weight of monomers used to make the copolymer, of, in copolymerized form, one or more adhesion promoter monomer, such as a ureido group containing (meth)acrylate.

The vulcanized or crosslinked rubber granules may have a sieve particle size of from 0.7 to 8 mm, or, preferably, from 0.85 to 5 mm.

The (iv) one or more high boiling alcohols in the aqueous textured layer forming compositions may be chosen from hydroxyl group containing esters of $C_3$ to $C_8$ alkanoates, such as hydroxyl group containing isobutyrate esters; hydroxyl group containing alkyl esters of fatty acids; hydroxyl group containing alkyl ethers; $C_6$ to $C_{12}$ branched alkanols; and hydroxyl group containing fatty ethers, preferably, at least one of which is a hydroxyl group containing isobutyrate ester.

The first component of the aqueous textured layer forming compositions may further comprise a filler, preferably, a filler that comprises a hydroxyl or hydrolysable group in an aqueous medium, for example, a silicate or an aluminum oxide.

In another aspect in accordance with the present invention, a method of using the aqueous textured layer forming compositions of the first aspect of the present invention comprises applying the two-component aqueous textured layer forming compositions to a substrate, such as by using a paver, a screening device or trowel to form a top coat layer as a top coat layer. The methods may further comprise allowing the top coat layer to dry. The substrate may be chosen from any of a cement, concrete, tamped stone or asphalt base (base), a primed base comprising the base having a primer layer thereon, a base having thereon a cushioning layer comprising a composite of vulcanized or crosslinked rubber granules or an elastomeric layer, or a primed base having thereon both a cushioning layer and a primer layer. The method may comprise mixing the two components of the aqueous textured layer forming compositions of the present invention prior to or during their application. The aqueous textured layer forming compositions used in the methods of the present invention may comprise the compositions as set forth in any one of paragraphs [0006], [0007], [0008], [0009] or [0010], above.

In yet another aspect in accordance with the present invention, a multilayer sport surface comprises a cement, concrete, tamped stone or asphalt base (base), having thereon a cushioning layer comprising a composite of vulcanized or crosslinked rubber granules or an elastomeric layer, further having, a primer layer on the cushioning layer, and, still further, having thereon, a weatherable textured top coat layer comprising a matrix of a polyurethane (polycarbamate) crosslinked acrylic copolymer blend of (a) a first acrylic copolymer A having a calculated glass transition temperature (calculated Tg) of from −60 to −5° C. and, (b) a second acrylic copolymer B having a calculated Tg of from 15 to 60° C. in a solids weight ratio of copolymer A:copolymer B of from 25:75 to 75:25, or, preferably, from 30:70 to 70:30, the matrix having dispersed therein vulcanized or crosslinked rubber granules, preferably, ethylene propylene diene monomer (EPDM) rubber, or recycled rubber, in an amount wherein a solids weight ratio of the acrylic copolymer blend:vulcanized or crosslinked rubber granules ranges from less than 1:4 to 1:9, or, preferably, from 1:4.5 to 1:8, wherein, further, the matrix comprises each of one or more polyalkylene oxide rheology modifiers and one or more high boiling alcohols, with the one or more polyalkylene oxide rheology modifiers having a viscosity average molecular weight of from 400,000 to 5,000,000, or, preferably, from 480,000 to 2,500,000, such as a polyethylene oxide having a viscosity average molecular weight of from 400,000 to 5,000,000, and the one or more high boiling alcohols having a normal boiling point of from 170 to 315° C., or, preferably, from 180 to 300° C., and having a formula MW of 100 to 250, such as from 130 to 250. The crosslinked acrylic copolymer blend comprises, in crosslinked form, an aliphatic polycarbamate and a silane containing group. Preferably, the (one or more high boiling alcohols in the textured top coat layer may be chosen from hydroxyl group containing esters of $C_3$ to $C_8$ alkanoates, such as hydroxyl group containing isobutyrate esters; hydroxyl group containing alkyl esters of fatty acids; hydroxyl group containing alkyl ethers; $C_6$ to $C_{12}$ branched alkanols; and hydroxyl group containing fatty ethers.

DETAILED DESCRIPTION OF THE INVENTION

In accordance with the present invention aqueous compositions comprising vulcanized or crosslinked rubber granules enable the formation of weatherable top coat layers. In the aqueous compositions, a blend of soft and hard acrylic emulsion copolymers and a combination of a high boiling alcohol and a polyalkylene oxide rheology modifier enables the provision of a higher proportion of the vulcanized or crosslinked rubber granules in use. This, in turn, provides top coat layers having enhanced color and ultraviolet (UV) stability, tensile strength and elongation at break. The aqueous compositions have two components, whereby the acrylic emulsion copolymer blend is crosslinked in the aqueous textured layer forming compositions with a polyisocyanate and an epoxy silane. The present invention avoids a problem whereby addition of compatible thickeners like polyethylene oxide (PEO) to aqueous compositions requires such a level of shear as to lead to an increase in the water load in the composition by 50 wt. % or more. Using lower alkanols to introduce thickeners into the composition, the low boiling point of such alkanols would result in an unsuitably high VOC level. Inclusion in the composition of a higher molecular weight alcohol having a high boiling point, such as 2,2,4-trimethyl-1,3-pentanediol monoisobutyrate (boiling point: 255° C.) avoids an increase in VOC level. At the same time, the high boiling alcohols function as coalescents and enable a more flexible copolymer matrix in top coat layers, thereby improving the function of, for example, sports track or playground top coat layers at cooler temperatures. Despite the inventive higher level of rubber granule solids in the aqueous textured layer forming compositions of the present invention, the compositions exhibit a good pot life after mixing the two components together. Further, the aqueous textured layer forming compositions can be mixed in the same equipment used to form a cushioning layer without adversely impacting the pot life of the aqueous textured layer forming compositions even if the cushioning layer compositions comprise an aromatic polyisocyanate.

Unless otherwise indicated, all temperature and pressure units are room temperature (21 to 23° C.) and standard pressure (1 atm). In addition, unless otherwise indicated, all conditions include a relative humidity (RH) of from 45 to 55%.

Unless the context clearly dictates otherwise, the singular forms "a," "an," and "the" include plural referents.

Unless defined otherwise, technical and scientific terms used herein have the same meaning as is commonly understood by one skilled in the art.

All ranges are inclusive and are combinable. Thus, for example, the disclosure of a range which comprises less than 1:4 to 1:9, or, preferably, from 1:4.5 to 1:8; will be read as including ranges of from less than 1:4 to 1:9, or, less than 1:4 to 1:8, or, from 1:4.5 to 1:9, or, less than 1:4 to 1:4.5, or, preferably, from 1:4.5 to 1:8.

All phrases comprising parentheses denote either or both of the included parenthetical matter and its absence. For example, the phrase comprising "(meth)acrylate" includes, in the alternative, acrylate and methacrylate.

As used herein, the term "acrylic monomer" refers to any of (meth)acrylic acids, alkyl (meth) acrylates, (meth)acrylamides, (meth)acrylonitriles and functional group containing forms thereof, for example, hydroxyalkyl (meth)acrylate.

As used herein, the term "aqueous" includes water and mixtures comprised substantially of water and water-miscible solvents, wherein "comprised substantially of" means that only the recited materials are included in or added to the solvent composition. Some impurities or other trace materials, such as less than 0.5 wt. %, may still be present in compositions comprised substantially or recited materials.

Unless otherwise indicated, as used herein, the term "sieve particle size" or "PS" refers to an average particle size as determined by sieving wherein the reported particle size is the mesh size or linear resolution in mm or microns of the smallest mesh through which the whole composition will pass, not counting impurities.

As used herein, unless otherwise indicated, the term "calculated Tg" or "calculated glass transition temperature" refers to the Tg of a polymer calculated by using the Fox equation (T. G. Fox, *Bull. Am. Physics Soc.*, Volume 1, Issue No. 3, page 123 (1956). For reference and use in calculating a Tg, a comprehensive compilation of available data describing glass transition temperatures of homopolymers from suitable monomers can be found in *Polymer Handbook*, Vol. 1, editors Brandrup, J.; Immergut, E. H.; Grulke, E. A., 1999, pages VI/193-277.

Unless otherwise indicated, as used herein, the phrase "application conditions" means standard pressure and ambient outdoor temperature or room temperature (21 to 23° C.). The application conditions comprise all temperatures and pressures at which a two-component aqueous composition is mixed or at which an aqueous composition is applied to any substrate.

As used herein, the phrase "based on the total weight of monomers used to form the emulsion polymer," refers to all addition monomers, such as, for example, carboxylic acid functional vinyl or ethylenically unsaturated monomers, and chain transfer agents which leave a residue in the polymer, such as hypophosphites or their salts.

As used herein, the term "copolymer" refers, in the alternative, to a polymer made from two or more different monomers, such as a copolymer, a terpolymer, a tetrapolymer, a pentapolymer etc., and may be any of a random, block, graft, sequential or gradient polymer.

As used herein, the term "formula MW" refers to the atomic mass or molar mass of one mole of a molecule having an idealized or representative structure and does not take into account to molecular weight of a distribution or isomeric mixture thereof.

As used herein, the term "ISO" refers to the publications of the International Organization for Standardization, Geneva, CH.

As used herein, unless otherwise indicated, the term "normal boiling point" refers to the boiling point of a liquid or fluid at 760 mm/Hg.

As used herein the term "substantially free" of any given material, composition or ingredient, such as formaldehyde, a volatile amine, alkylphenyl ethoxylates, or a solution polymer refers to any of compositions, articles containing them and methods of making or using them wherein the referenced compositions, articles or methods containing no such added materials or ingredients. The amount of the given material, composition or ingredient will be less than 5000 ppm, or, preferably, less than 1000 ppm, based on the total weight a composition stated to be substantially free of it.

As used herein, the phrase "total solids" or "solids weight" or its equivalent refers to weight amounts of all of the non-volatile ingredients or materials in a given composition in comparison to the total weight of the referenced material or composition that may include volatiles. Volatile ingredients include both water and ammonia as well as volatile solvents that volatilize at standard pressure and 40° C. or less.

As used herein, unless otherwise indicated, the term "viscosity average molecular weight" or "MWv" refers to molecular weight of a composition determined by comparison of its viscosity to that of a calibrated set of appropriate reference standards having known molecular weights and viscosities, such as polyethylene oxide for a polyalkylene oxide rheology modifier, wherein the viscosity of the reference standards has been measured in the same manner, with same indicated solids, the same carrier or solvent, and under the same temperature, shear and measurement conditions as the viscosity of the analyte.

As used herein, the term "wt. %" stands for weight percent.

The first component of the aqueous textured layer forming compositions in accordance with the present invention comprise an acrylic emulsion copolymer blend of a first acrylic emulsion copolymer A and a second acrylic emulsion copolymer B. The acrylic emulsion copolymer blend is a blend of a soft acrylic emulsion copolymer A and a hard acrylic emulsion copolymer B. The acrylic emulsion copolymers in accordance with the present invention comprise the polymerization product of addition polymerizable ethylenically unsaturated monomers, such as vinyl or acrylic monomers. Preferably, the aqueous textured layer forming compositions are substantially free of alkylphenyl ethoxylates (APEO). More preferably, the aqueous textured layer forming compositions are substantially free of volatile organic compounds and alkylphenyl ethoxylates (APEO).

The acrylic emulsion copolymers useful in the aqueous textured layer forming compositions may comprise, in copolymerized form, various combinations of one or more acrylic ester monomers, one or more ethylenically unsaturated carboxylic acid group containing monomers or their salts, such as acrylic, or methacrylic acid, one or more carboxylic amide group containing monomers or their salts, such as (meth)acrylamide, and one or more additional acrylic or vinyl monomers. The combination of monomers may be chosen in the manner known to the ordinary skill artisan in mixtures and proportions that provide acrylic emulsion copolymers having the recited Calculated Tg in accordance with the present invention.

Suitable vinyl or acrylic monomers for use in making the acrylic emulsion copolymers of the present invention may include ethylenically unsaturated monomers, such as (meth) acrylic ester monomers like $C_1$ to $C1_8$ alkyl (meth)acrylates, for example, methyl acrylate, ethyl acrylate, butyl acrylate, 2-ethylhexyl acrylate, nonyl acrylate, decyl acrylate, lauryl acrylate, methyl methacrylate, ethyl methacrylate, butyl methacrylate, nonyl methacrylate, isodecyl methacrylate, lauryl methacrylate; hydroxyalkyl (meth)acrylates, such as hydroxyethyl acrylate, hydroxypropyl acrylate, hydroxyethyl methacrylate, and hydroxypropyl methacrylate; diethylenically unsaturated monomers, such as 1,3-butanediol dimethacrylate; (meth)acrylamides; alkyl allyl ethers; allyl alcohols; (meth)acrylonitriles; styrene or alkyl substituted styrene; or mixtures thereof.

A suitable acrylic emulsion copolymer B is PRIMAL™ AC-261 K binder (The Dow Chemical Co., Midland, MI); an example of a suitable acrylic emulsion copolymer A can be either Elastene™ 2848 NG binder or PRIMAL™ EC-2949 APEO free binder (Dow).

Suitable aqueous emulsion polymerization techniques useful for preparing the copolymers of the acrylic emulsion copolymer blend in accordance with the present invention are well known in the art. Thermal, redox, photochemical, and electrochemical initiation processes may be used wherein the aqueous polymerization media comprise one or more initiators, and one or more surfactants or emulsifiers. The copolymers may be prepared as an aqueous mixture with a solids level of from 20 to 70 wt. %, preferably in the range of from 30 to 60 wt. %.

Suitable free radical initiators or oxidants may include, for example, persulfates, such as, for example, ammonium and/or alkali metal persulfates; peroxides, such as, for example, sodium or potassium hydroperoxide, t-alkyl peroxides, t-alkyl hydroperoxides, dicumyl hydroperoxide; perboric acids and their salts, such as, for example, sodium perborate; and ammonium or alkali metal salts of peroxydisulfuric acid. Such initiators may be used in amounts ranging from 0.05 to 3.0 wt. %, based on the total weight of monomers used to make a copolymer. Suitable redox catalysts may use the same free radical initiators coupled with a suitable reductant such as, for example, (iso)ascorbic acid, sodium sulfoxylate formaldehyde, sodium or alkali metal (bi)sulfite; thiosulfates, hydrosulfites; (hydro)sulfide or dithionite; formadinesulfinic acid; hydroxymethanesulfonic acid; sodium 2-hydroxy-2-sulfinatoacetic acid; and acetone bisulfite; and salts of thereof may be used in amounts of 0.01 to 5.0 wt. %, based on the total weight of monomers used to make a copolymer.

Conventional surfactants or emulsifiers may be used in polymerization, including, anionic emulsifiers, such as alkali or ammonium alkyl sulfates and oxyethylated alkyl phenol sulfates, nonionic emulsifiers, such as polyoxyethylenated alkyl alcohols, amine polyglycol condensates and alkylpolyether alcohols; or their combination. Typical ranges for surfactants are between 0.05 to 10 wt. %, or, preferably, 0.05 to 5 wt. %, based on the total weight of monomers used to make the copolymers.

Chain transfer agents may be used to control the molecular weight of the copolymers. Examples of suitable chain transfer agents include mercaptans, polymercaptans, and polyhalogen compounds, including alkyl mercaptans such as n-dodecyl mercaptan, which may be used from 0 to 6 wt. %, or, from 0.1 to 3 wt. %, based on the weight of the ethylenically unsaturated monomers in the monomer mixture used to prepare the copolymers. Mercaptans are preferred. The polymer molecular weight may be controlled by other techniques known in the art, such as selecting the ratio of the initiator to ethylenically unsaturated monomer.

The copolymers A and B in accordance with the acrylic emulsion copolymer blend of the present invention may have a weight average particle size of from 100 to 500 nm, or, preferably, from 200 to 400 nm. The diameter of the copolymer particles may be controlled in one or more of several ways known in the art. To increase the weight average particle size, the amount of conventional surfactants or emulsifiers added during the emulsion polymerization process may be decreased, or the rate of shear during polymerization may be decreased, or the metal ion or salt content present during and after polymerization may be raised, or any combination thereof. Preferably, a preformed polymer seed may also be used where the weight average particle size of the seed is small enough, for example, 25 to 60 nm, to grow out the copolymer to a desired average particle size.

The first component of the aqueous textured layer forming compositions of the present invention further comprise (ii) vulcanized or crosslinked rubber granules. Examples of suitable vulcanized or crosslinked rubber granules useful in the present invention comprise styrene butadiene rubber (SBR), ethylene-propylene-diene monomer (EPDM) rubber, ethylene propylene rubber, butadiene rubber, natural rubber, styrene butadiene copolymer, hydrogenated nitrile, nitrile rubber, neoprene, polychloroprene, or recycled rubber, such as ground tire rubber (GTR), or waste rubber, or mixtures thereof. Waste rubber may come from any known source, such as, for example, tires, shoe soles, and ground tire rubber. The vulcanized or crosslinked rubber granules useful in the present invention may have a sieve particle size of 0.5 mm or more, 0.7 mm or more, or even 0.85 mm or more, and at the same time, 8 mm or less, or 5 mm or less.

The vulcanized or crosslinked rubber granules may preferably be chosen from ethylene propylene diene monomer (EPDM) rubber, polyurethane rubber, styrene-butadiene rubber, natural rubber, nitrile or acrylonitrile butadiene styrene rubber (ABN), or recycled rubber, such as ground tire rubber (GTR) in an acrylic emulsion copolymer total solids:rubber granule solids weight ratio of from less than 1:4 to 1:9, or, preferably, from 1:4.5 to 1:8.

To adjust rheology, the first component of the aqueous textured layer forming compositions in accordance with the present invention comprise (iii) one or more polyalkylene oxides having a viscosity average molecular weight of at least 500,000, or, preferably, a polyethylene oxide. The rheology modifier has been found to provide some internal cohesiveness and wet adhesion/stickiness to the crosslinked or vulcanized rubber granules. In addition, the aqueous textured layer forming compositions comprise one or more (iv) high boiling alcohols. The high boiling alcohol may help disperse the rheology modifier in the absence of any volatile organic compounds.

The one or more (iv) high boiling alcohols in the aqueous textured layer forming compositions may be chosen from hydroxyl group containing alkyl, oxygenated alkyl, and branched alkyl esters of $C_3$ to $C_8$ alkanoates, such as, for example, esters of isobutyrates e.g. 2,2,4-trimethyl-1,3-pentanediol monoisobutyrate or 2,2,4-trimethyl-1,3-pentanediol diisobutyrate; hydroxyl group containing (branched) alkyl, alkylaryl or alkoxyalkyl esters, glycerides, amides or alkoxylates of fatty acids; or hydroxyl group containing (branched) alkyl, alkylaryl or alkoxyalkyl ethers and alkoxylates of fatty alcohols. Suitable amounts of the one or more high boiling alcohols may range from 1 to 10 wt. %, based on the total weight of the acrylic emulsion copolymer blend of the aqueous textured layer forming compositions.

The aqueous textured layer forming compositions in accordance with the present invention may further comprise in the first component one or more defoamers. Suitable defoamers may be silicon containing defoamers, mineral oil containing defoamers, ethylene oxide or propylene oxide containing defoamers, or mixtures thereof. Suitable commercially available defoamers may include, for example, a NOPCO™ NXZ metallic soap, TEGO™ Airex 902 W and TEGO™ Foamex 1488 polyether siloxane copolymer emulsions (Tego, Evonik Industries, Essen, DE), BYK-024 silicone defoamer (BYK, BYK-Chemie GmbH, Wesel, DE), or mixtures thereof. Suitable amounts of the defoamer may range, based on the total weight of the first component of the aqueous textured layer forming compositions, from 0.01 to 1 wt. %, from 0.05 to 0.8 wt. %, or from 0.1 to 0.3 wt. %.

The first component of the aqueous textured layer forming compositions in accordance with the present invention preferably further comprise a lubricant, such as a fatty acid metal salt, like calcium stearate. Suitable amounts of the lubricant may be, as solids, based on the total weight of the first component of the aqueous textured layer forming compositions, from 0.05 to 1 wt. %, from 0.1 to 0.8 wt. %, or from 0.1 to 0.5 wt. %.

The first component of the aqueous textured layer forming compositions in accordance with the present invention preferably further comprise a filler or, more preferably, a hydrolyzable group or hydroxyl group containing filler, such as a silicate, for example, a sodium-potassium alumina silicate (nepheline syenite) or aluminum oxides. Such fillers form hydroxyl or hydrolysable groups in water. Suitable amounts of the filler may range, as solids, based on the total weight of the first component of the aqueous textured layer forming compositions, from 0 to 50 wt. %, or, from 1 to 40 wt. %.

The first component of the aqueous textured layer forming compositions may further comprise any one or combination of the following additives: Inorganic extenders, pigments, fillers, buffers, neutralizers, dispersants, humectants, mildewcides, biocides, anti-skinning agents, colorants, flowing agents, anti-oxidants, plasticizers, leveling agents, dispersants, adhesion promoters, diluents and grind vehicles.

Any additives may be in an amount of from 0.001 to 10 wt. %, or from 0.01 to 2 wt. %, based on the total weight of the first component of the aqueous textured layer forming compositions.

As a second component, the aqueous textured layer forming compositions of the present invention include (v) one or more aqueous polyisocyanate dispersions and an epoxy silane as a crosslinking agent. Such an aqueous polyisocyanate dispersion may be made from a polyisocyanate by at least partially reacting it with at least one anionic group containing reactant, at least one polyethylene oxide, both an anionic group containing reactant and a polyethylene oxide, a tertiary amine, such as triethylamine, or an aminoalcohol, such as triethanolamine, preferably an anionic group. After neutralization, the polyurethane may be dispersed in water under agitation to yield a dispersion. As used herein, the term "anionic group" refers to a chemical group that carries negative charge when mixed with water. the anionic group may be associated with one or more cations, which may be a metal cation or an organic compound with a cationic group. Preferred anionic groups may be chosen from sulphonate groups, carboxylate groups, carboxylic acid groups, such as in dimethyl propionic acids, phosphonate groups, or mixtures thereof.

Suitable polyisocyanates are any isocyanate functional group containing compound having two or more isocyanate groups. A polyisocyanate may be a prepolymer made by reacting an excess of an organic polyisocyanate(s) with an organic compound(s) containing two or more isocyanate-reactive groups, particularly, a polyol. The reaction may be carried out in the presence of a catalyst such as organic tin compounds and/or tertiary amines.

Polyisocyanates are well known in the art and include aliphatic, cycloaliphatic and/or aromatic isocyanates containing at least 2 isocyanate groups per molecule. Suitable aliphatic diisocyanates may include, for example, hexamethylene diisocyanates and propylene diisocyanate. Suitable cycloaliphatic diisocyanates include, for example, isophorone diisocyanate, and the hydrogenation products of aromatic diisocyanates such as methylene diphenylisocyanate (MDI). Suitable aromatic diisocyanates include, for example, toluene diisocyanate and methylene diphenylene diisocyanate, and others known in the art, as well as isomers or isomeric mixtures thereof. Suitable triisocyanates may include, for example, buirets, like the biuret of hexamethylene diisocyanate and water, isocyanurates, like the isocyanurate of hexamethylene diisocyanate, the product of addition of isophorone diisocyanate to trimethylolpropane. Other suitable aliphatic polyisocyanates include 1,6-hexamethylene diisocyanate (HDI), 1-isocyanato-3-isocyanatomethyl-3,5,5-trimethyl-cyclohexane (IPDI), 4,4'-diisocyanatodicyclohexylmethane (HMDI), diisocyanatomethyl-cyclohexane (ADI), isomers thereof, polymers thereof, or mixtures thereof. Other suitable aromatic polyisocyanates are toluene-2,4-diisocyanate (2,4-TDI), toluene-2,6-diisocyanate (2,6-TDI), naphthylene-1,5-diisocyanate, diphenylmethane-4,4'-diisocyanate (MDI), isomers thereof, polymers thereof, and mixtures thereof.

Suitable commercially available water-dispersible isocyanate compositions include, for example, BAYHYDUR™ XP2655 hydrophilic aliphatic polyisocyanate made from hexamethylene diisocyanate or BAYHYDUR™ ULTRA 2487/1 hydrophilic aliphatic polyisocyanate made from hexamethylene diisocyanate (Covestro, Pittsburgh, PA).

The concentration of polyisocyanate crosslinking agents in aqueous textured layer forming compositions of the present invention may range from 1 wt. % or more, 2 wt. % or more, and at the same time, 10 wt. % or less, or 8 wt. % or less, or 5 wt. % or less, based on the total solids weight of acrylic emulsion copolymer blend. Preferably, the concentration of the polyisocyanate composition ranges from 2 to 8 wt. %, based on the total solids weight of the acrylic emulsion copolymer blend.

The second component of the aqueous textured layer forming compositions in accordance with the present invention preferably further comprises an epoxy silane, for example, a glycidoxypropyl trialkoxy silane. Suitable amounts of the epoxy silane may range, as solids, based on the total weight of the component of the aqueous textured layer forming compositions, from 0.5 to 8 wt. %, or, from 1 to 7 wt. %. The solids weight ratio of the water-dispersible isocyanate composition to the epoxy silane may range from 0.4:1 or more, or, 0.6:1 or more, or, even 1.5:1 or more; and at the same time, 10:1 or less, or, 5:1 or less, or, 2.5:1 or less.

Suitable commercially available epoxy silanes include, for example, SILQUEST™ A-187, SILQUEST™ WetLink 78, SILQUEST™ A-186, and COATOSIL™ 2287 epoxy silanes available from Momentive Performance Material, or OFS 6040 silane (Dow Corning, Midland, MI).

In another aspect in accordance with the present invention, the present invention provides methods comprising applying the two-component aqueous textured layer forming compositions to a substrate to form a textured top coat layer. The applying may comprise known troweling, paving or grading equipment. Where the substrate is a primer layer, a cushioning layer or a cement or asphalt base, or any layer of the multilayer sport surface in accordance with the present invention, the same application equipment may be used for any or all layers. The methods may further comprise curing the textured top coat layer. Still further, the methods may comprise mixing the two components of the aqueous textured layer forming compositions just prior to or at the time of application, which may include mixing in the application equipment itself.

In the methods in accordance with the present invention, any aqueous composition can be applied to a base by any known methods, for example, manual troweling or machine applying using conventional running track paving equipment, such as a PlanoMatic™ P928 automatic paving machine type synthetic running track paver or a Plano-Matic™ P211 semi-automatic paver (SMG Sportplatzmaschinenbau Gmbh, Vöhringen, DE). The obtained surface may be further smoothed by troweling. The base can be any, for example, concrete, bitumen, metal, or wood. The base or the cushioning layer can be primed by a polyurethane containing primer composition, such as a polyurethane primer, prior to applying the aqueous textured layer forming composition. In preparing the multilayer sport surface, drying and curing of any aqueous composition may be carried out at a predetermined temperature and for a predetermined period of time sufficient to evaporate water. Drying and curing may be conducted at ambient temperature.

The aqueous textured layer forming compositions of the present invention may be cured at a temperature of generally from 5 to 80° C., or, from 10 to 50° C., or, from 15 to 40° C., or from 20 to 35° C. The time of curing the polymer mixture may range from 30 minutes to 8 days, from 1 hour to 48 hours, or from 2 hours to 10 hours. Higher temperatures speed curing. It is also operable to partially cure the polymer mixture and then complete the curing process at a later time.

In making the multilayer sport surface in accordance with the present invention, the time period between the application any composition, such as a cushioning layer forming composition, a primer layer forming composition or a first layer of an aqueous textured layer forming composition and the application of a layer of the aqueous composition or a second layer thereof, may range, for example, from 8 hours or less, 6 hours or less, or even 5 hours or less, and at the same time, 2 hours or more, 2.5 hours or more, or even 3 hours or more.

In yet another aspect, the present invention provides a multilayer sport surface comprising a base having thereon a cushioning layer, further having, on the cushioning layer a primer layer, and, still, further, having thereon a weatherable textured top coat layer. The cushioning layer comprises a composite of vulcanized or crosslinked rubber granules or an elastomeric layer, for example, a crosslinked composite dispersion of vulcanized or crosslinked rubber granules dispersed in a matrix of a polyurethane, an elastomeric acrylic polymer, or a mixture or combination thereof. The elastomeric acrylic may be formed from the same acrylic emulsion copolymer blend as is used to form the textured top coat layer or composition or an acrylic emulsion copolymer comprising, in copolymerized form, a diethylenically unsaturated monomer, such as divinyl benzene, and having a calculated Tg of from −60 to 5° C. The polyurethane may be formed from the reaction product of the polyisocyanate of the textured top coat layer with a polyol, such as a polyether polyol, wherein the polyisocyanate is preferably an aromatic polyisocyanate. The primer layer includes a composition for forming a polymer matrix and an epoxy silane or epoxy resin, such as γ-glycidoxypropyl trialkoxysilane; the polymer matrix of the primer layer may be formed from a composition such as the acrylic emulsion copolymer blend of the textured top coat layer composition, or an acrylic emulsion copolymer having a calculated Tg of from −60 to 5° C. as in the cushioning layer. The amount of the epoxy resin or silane in the primer layer forming composition may range from 0.1 to 5 wt. %, based on the total solids weight of the polymer matrix forming composition. In the cushioning layer of the multilayer sport surface of the present invention, the weight ratio of acrylic emulsion copolymers and/or polyurethane solids to the vulcanized or crosslinked rubber granules may be 1:6.5 or lower, or even 1:7 or lower, and at the same time, 1:11 or higher, or even 1:10 or higher. The vulcanized or crosslinked rubber granules in the base layer may have a sieve particle size of from 0.7 to 8 mm, preferably from 0.85 to 5 mm, and more preferably from 1 to 5 mm. The vulcanized or crosslinked rubber granules in the base layer preferably comprise recycled rubber or styrene butadiene rubber.

The primer layer of the multilayer sport surface of the present invention, may be used to further improve the adhesion of the multilayer article to a base or other layer substrate. The primer layer may be made from a primer composition comprising the first acrylic emulsion copolymer A, the second acrylic emulsion copolymer B, mixtures thereof as an acrylic emulsion copolymer blend, or another acrylic emulsion copolymer. The primer composition may further comprise an epoxy silane to further improve adhesion of the resultant multilayer article to a base under wet conditions. The primer composition may also comprise an isocyanate prepolymer composition like that of the aqueous textured layer forming composition. Preferably, the primer composition comprises the first and second acrylic emulsion copolymers A and B as a blend, the epoxy silane, and the water-dispersible poly isocyanate composition. Amounts of the above materials in the primer composition may have the ranges above as they are used in the aqueous textured layer forming compositions. The multilayer article of the present invention may further comprise other functional layers. For example, the multilayer article may further comprise a protective layer, so that the top layer resides between the protective layer and the base layer. The presence of the protective layer may be useful to further improve abrasion resistance and aging resistance of the multilayer article.

The multilayer sport surface and the aqueous textured layer forming compositions in accordance with the present invention may be used, for example, in sound proofing materials, acoustic underlayment, flooring underlayment and matting; industrial or sports utilities, such as artificial track and playground surfaces, ball cores, and in consumer products, such as floor tiles and coverings; in molded products; and in road paving and maintenance applications. In particular, the multilayer sport surface is suitable for use in running track, tennis court or rubberized playground surfaces.

Examples

The following examples illustrate the present invention. Unless otherwise indicated, all parts and percentages are by weight and all temperatures are in ° C. In the examples and Tables 1, 2 and 3 that follow, the following abbreviations were used: AA: acrylic acid, AN: Acrylonitrile; DVB: Divinyl Benzene; MAA: methacrylic acid, S: Styrene, MMA: Methyl methacrylate, BA: butyl acrylate, SHP: sodium hypophosphite; UEMA: Ureidoethyl functional methacrylate; BP: Benzophenone. Table 1, below, shows the materials used.

In the examples that follow, the formulations tested are shown in Table 2A and 2B, below. In all formulations, the high boiling alcohols and the polyalkylene oxide rheology modifier were preblended by hand with a spatula, and each of the separate components were premixed with the first component subject to a grind at 600 rpm to disperse the rubber granules and any fillers. Prior to use, and materials were mixed to form the aqueous compositions that were applied and used as set forth in the test methods that follow.

In the examples that follow, the following test methods were used.

Tensile Strength and Elongation with Dogbone Sample Specimen Molded Under Pressure:

The indicated formulations with rubber granules were mixed, spread onto a mold having a polytetraflouroethylene release surface in which steel spacers (1 cm) were fixed by tape to form a sheet having an area of 18 cm×30 cm. The formulations were pressed by spatula in the frame to give a textured top coat layer having 1 cm thick layer. To achieve more homogenous layers, silicon release paper and then fiber cement panels weighing 3 Kg were placed on the layer to press it for 30 minutes. The layer was let cure for 7 days in 23° C. and 50% RH prior to testing and was cut to create 15 samples with a dog bone shape (ISO 527-2 Type 1A) cutting die. Ten specimens were tested at RT condition and 5 specimens were tested after immersion for 1 day in water. The tensile and elongation measurements were carried out with Zwick Roell Allround-Line 2.5 kN tester (Zwick GmbH & Co. KG, Ulm, DE). The pull speed was set to 100 mm/min; a clamp gap of 110 mm was used. The tensile strength was reported at maximum and elongation reported at break. Results are shown in Table 3, below.

Tensile Strength and Elongation Rectangular Specimens:

The indicated formulations were cured as above as 1 cm thick cured sample sheets, except without release paper and fiber cement pressing, and were cut to a rectangular shape of 3.5×10 cm. The tensile test was then carried out with Zwick Roell Z005 mechanical tester (Zwick GmbH & Co). The clamp gap was 50 mm and the pull speed was set to 50 mm/min. For the tensile strength the maximum values were reported. The reported elongation values were elongation at break values. Results are shown in Table 3, below.

Color Stability:

The two components of the indicated formulations were mixed together and then combined for 2 minutes with the indicated rubber granules. The resulting compositions were then packed into a petri dish to form a layer and subject to 48 hr aging in an ultraviolet (UV) chamber with a Xenon lamp. After aging, the layers were inspected visually for yellowing.

TABLE 1

| Materials Used | | |
| --- | --- | --- |
| Material | Chemical | |
| High boiling alcohol 1 | 2,2,4-Trimethyl-1,3-pentanediol monoisobutyrate | BP 255° C. |
| High boiling alcohol 2 | Dipropylene glycol n-butylether | BP 230° C. |
| Alcohol | Ethanol | |
| Rheology modifier 1 | Poly (ethylene oxide); MWv~500,000 | |
| Rheology modifier 2 | Polyvinylalcohol PVOH 26-88 (16 wt. % premix in water at 90° C.) (Kuraray) | |
| Acrylic emulsion copolymer A | BA 80.1 wt %/MMA 12.7 wt %/AN 5.6 wt %/MAA 1.1 wt % + 0.5 wt % surfactants, BP 0.17 wt. %; Avg. Particle size: 360-440 nm; Solids: 54.5-55.5 wt. %; pH: 8.0-9.0 | Calculated Tg −34° C. |
| Acrylic emulsion copolymer B | BA 45.1 wt %/MMA 51.9 wt %/AA 1.0 wt %/UEMA 2 + wt. % surfactant; Avg. Particle size: 115-155 nm; Solids: 49.5-50.5 wt. %; pH: 8.5-9.2 | Calculated Tg 12° C. |
| Crosslinking agent 1 | Polyisocyanate from hexamethylene diisocyanate (HDI) (BAYHYDUR ™ ULTRA 2487/1, Covestro) | |
| Crosslinking agent 2 | Glycidoxypropyltrimethoxysilane (99 wt. % active) | |
| Crosslinking agent 3 | Aromatic polyisocyanate from 39 wt. % of methylene diphenylisocyanate (MDI) (47wt. % of 2,4' isomers) and 41 wt. % of polyoxypropylene diol (MWv 2000) | Comparative |
| Crosslinking agent 4 | Aromatic diisocyanate MDI (47 wt. % of 2,4' isomers) | |
| Lubricant | Calcium stearate (50% w/w aq. disp, CD 211 eChem) | |
| Surfactant | Secondary alcohol ethoxylate (98% active, TRITON ™ HW 1000, Dow) | |
| Defoamer | Mineral oil (Foamaster ™ MO NXZ, BASF) | |
| Rubber granules | Red EPDM-Microscopic image particle sizes range from the longest axis of > 4 mm and shorter axis > 2mm | |

TABLE 2A

| | | | EXAMPLE | | | |
|---|---|---|---|---|---|---|
| Material | 1*<br>(g) | 2<br>(g) | 3<br>(g) | 4<br>(g) | 5<br>(g) | 6²<br>(g) |
| First component | | | | | | |
| Acrylic emulsion copolymer A | 333.0 | 333.0 | 333.0 | 333.0 | 333.0 | 114.14 |
| Acrylic emulsion copolymer B | 667.0 | 667.0 | 667.0 | 667.0 | 667.0 | 114.14 |
| Defoamer | 2.0 | 2.0 | 2.0 | 2.0 | 2.0 | 0.46 |
| Lubricant | 10.0 | 10.0 | 10.0 | 10.0 | 10.0 | 2.28 |
| Rheology modifier 2 | 2.0 | 2.0 | 2.0 | 2.0 | 2.0 | 3.20 |
| Rheology modifier 1 | 2.5 | 2.5 | 2.5 | 0.3 | 0.3 | 0.57 |
| High boiling alcohol 1 | | 7.5 | | 50.0 | | 10.27 |
| High boiling alcohol 2 | | | 7.5 | | 50.0 | |
| Alcohol | 7.5 | | | | | |
| Rubber Granules | 3222.0 | 3222.0 | 3222.0 | 3342.9 | 3342.9 | 741.44 |
| Total Wet First Component | 1024.0 | 1024.0 | 1024.0 | 1064.3 | 1064.3 | 247.5 |
| Second Component | | | | | | |
| Crosslinking agent 2 | 20.0 | 20.0 | 20.0 | 20.0 | 20.0 | 4.44 |
| Crosslinking agent 1 | 30.0 | 30.0 | 30.0 | 30.0 | 30.0 | 6.67 |
| Total Two-Component Wet Mixture | 1074.0 | 1074.0 | 1074.0 | 1114.3 | 1114.3 | 258.6 |
| Rubber Granules (wt. % ratio to two-component wet mixture) | 75:25 | 75:25 | 75:25 | 75:25 | 75:25 | 75:25¹ |
| Acrylic emulsion copolymer solids: rubber granules (w/w) | ~16% | ~16% | ~16% | ~16% | ~16% | ~16% |
| High boiling alcohol (wt. % of wet acrylic emulsion copolymer blend) | 0.75 | 0.75 | 0.75 | 5.0 | 5.0 | 4.5 |
| Soft:Hard Copolymer ratio (w/w) | 1:2 | 1:2 | 1:2 | 1:2 | 1:2 | 1.1:1 |

*—Denotes Comparative Example;

¹EPDM size range 1-3 mm;

²Contains 2.39 g of Secondary alcohol ethoxylate (98%) surfactant.

TABLE 2B

Formulations of Fillers or Various Polymer Ratios

| EXAMPLE<br>Material<br>First component | 6<br>(g) | 7<br>(g) | 8<br>(g) | 9<br>(g) | 10⁴<br>(g) |
|---|---|---|---|---|---|
| Acrylic emulsion copolymer A | 126.89 | 95.12 | 95.12 | 95.12 | 95.12 |
| Acrylic emulsion copolymer B | 63.35 | 95.12 | 95.12 | 95.12 | 95.12 |
| Defoamer | 0.38 | 0.38 | 0.38 | 0.38 | 0.38 |
| Lubricant | 1.90 | 1.90 | 1.90 | 1.90 | 1.90 |
| Dispersant³ | | 1.04 | 1.04 | 1.04 | |
| Surfactant | 1.99 | 1.99 | 1.99 | 1.99 | 1.99 |
| Filler | | 20.0¹ | 20.0² | | |
| Rheology modifier 2 | 2.66 | 2.66 | 2.66 | 2.66 | 2.66 |
| Rheology modifier 1 | 0.48 | 0.48 | 0.48 | 0.48 | 0.48 |
| High boiling alcohol 1 | 8.56 | 8.56 | 8.56 | 8.56 | 8.56 |
| Alcohol | | | | | |
| Rubber Granules⁵ | 784.53 | 763.49 | 763.49 | 783.49 | 782.68 |
| Total Wet First Component | 206.2 | 227.3 | 227.3 | 227.3 | 206.2 |
| Second Component | | | | | |
| Crosslinking agent 2 | 3.70 | 3.70 | 3.70 | 3.70 | 4.44 |
| Crosslinking agent 1 | 5.55 | 5.55 | 5.55 | 5.55 | 6.67 |
| Aromatic Crosslinking agent⁶ | | | | | |
| Total Two-Component Wet Mixture | 215.47 | 236.51 | 236.51 | 216.51 | 217.32 |
| Rubber Granules (wt. % ratio to two-component wet mixture) | 75:25 | 75:25 | 75:25 | 75:25 | 75:25 |

TABLE 2B-continued

Formulations of Fillers or Various Polymer Ratios

| EXAMPLE<br>Material<br>First component | 6<br>(g) | 7<br>(g) | 8<br>(g) | 9<br>(g) | 10⁴<br>(g) |
|---|---|---|---|---|---|
| Acrylic emulsion copolymer solids: rubber granules (w/w) | −13% | −13% | −13% | 12.8% | 12.7% |
| High boiling alcohol (wt. % of wet acrylic emulsion copolymer blend) | 4.5 | 4.5 | 4.5 | 4.5 | 4.5 |
| Soft: Hard Copolymer weight ratio (wet) | 67:33 | 50:50 | 50:50 | 50:50 | 50:50 |

*-Denotes comparative Example;

¹Portaflame ™ SG-10 filler Synthetic aluminum hydroxide (D50: 3.5 micrometers, Sibelco, Antwerp, BE);

²Minex ™ 4 Nepheline syenite (Sibeico);

³Orotan ™ 2500 dispersant S-AA copolymer 24.8 wt. %, 25 % aqua ammonia (6.7 wt. %) and DI water (68.5 wt %) (Dow);

⁴Rubber granules were washed in water and sieved prior to use;

⁵EPDM size range 1-3 mm;

⁶methylene diphenylisocyanate (MDI) (47 wt. % of 2,4' isomers).

TABLE 3

| | | | Tensile and Elongation Results | | |
|---|---|---|---|---|---|
| EXAMPLE | 1* | 2 | 3 | 4 | 5 |
| Test method | | | | | |
| 7 day RT Tensile (Mpa)-Rectangular specimen | 0.637 | 1.084 | 1.139 | 0.981 | 1.053 |
| 7 day RT Elongation % at break-Rectangular specimen | 34.97 | 67.77 | 71.73 | 95.23 | 109.17 |

*-Denotes comparative example.

As shown in Table 3, above, the inventive compositions of Examples 2, 3, 4 and 5 comprising a high boiling alcohol exhibit dramatically improved room temperature tensile strength and elongation at break when compared to the same aqueous composition having ethanol in Comparative Example 1.

TABLE 4

| | | | Tensile and Elongation Results | | |
|---|---|---|---|---|---|
| EXAMPLE | 6 | 7 | 8 | 9 | 10 |
| Test method | | | | | |
| 7 day RT DRY Tensile (Mpa)-Dogbone specimen | 0.360 | 0.491 | 0.501 | 0.401 | 0.368 |
| 7 day RT DRY Elongation % at break-Dogbone specimen | 46.90 | 56.14 | 53.09 | 64.18 | 63.5 |
| 7 day RT WET Tensile (Mpa)-Dogbone specimen | 0.200 | 0.272 | 0.342 | 0.307 | 0.267 |
| 7 day RT WET Elongation % at break-Dogbone specimen | 35.28 | 45.72 | 45.1 | 55.68 | 53.0 |

*-Denotes comparative example.

As shown in Table 4, above, the inventive compositions of Examples 6, 7, 8, 9 and 10, all exhibit the same level of improved wet and dry tensile and elongation in dogbone specimens as do the compositions in Examples 2, 3, 4, and 5. All inventive compositions are aqueous, substantially VOC free, substantially APEO free and comprise a high boiling alcohol.

The color stability results of tests of the compositions of inventive Example 6 exhibit only slight yellowing after 48 hour ultraviolet (UV) aging, whereas the same compositions having aromatic diisocyanates, even in lower amounts, based on the total solids weight of the acrylic emulsion copolymer blend, instead of aliphatic polyisocyanates exhibit pronounced yellowing after 48 hour UV aging. The color stability tests show that the inventive aqueous textured layer forming compositions having an aliphatic crosslinking agents provide a more UV stable product compared to the same aqueous textured layer forming compositions with an aromatic diisocyanate as a cross linker.

Pot Life Test and Result:

Three compositions substantially the same as Comparative Example 1 were formed without rubber granules using aromatic Crosslinking agent 3 and were drawn down into layers. The compositions, respectively, comprised 2.5, 5 and 10 wt. % of the crosslinking agent. The compositions containing 5 and 10 wt. % of the aromatic crosslinking agent exhibited films on the layer that were cured almost completely after one hour, whereas the compositions containing 2.5 wt. % of the aromatic crosslinking agent retained a film free layer after 1 and 3 hours. This shows that compositions like those of the present invention which enable a higher rubber granule proportion while maintaining a workable viscosity will also retain pot life for longer than known compositions. The lower amounts of crosslinking agent relative to the total weight of the aqueous textured layer forming composition also contribute to a longer pot life.

The invention claimed is:

1. A two-component aqueous textured layer forming composition comprising:

a first component of (i) an acrylic emulsion copolymer blend of (a) a first acrylic emulsion copolymer A having a calculated glass transition temperature (calculated Tg) of from −60 to −5° C. and, (b) a second acrylic emulsion copolymer B having a calculated Tg of from 15 to 60° C. in a solids weight ratio of copolymer A:copolymer B of from 25:75 to 90:10; (ii) vulcanized or crosslinked rubber granules, in an amount wherein a solids weight ratio of the acrylic emulsion copolymer blend:vulcanized or crosslinked rubber granules ranges from less than 1:4 to 1:9, (iii) one or more polyalkylene oxides having a viscosity average molecular weight of from 400,000 to 5,000,000; and (iv) one or more high boiling alcohols having a normal boiling point of from 170 to 315° C. and, further, having a formula MW of 100 to 250; and, as a second component, (v) a crosslinking agent comprising both an aliphatic water-dispersible polyisocyanate composition and an epoxy silane.

2. The aqueous textured layer forming composition as claimed in claim 1, wherein the (ii) vulcanized or crosslinked rubber granules comprise ethylene propylene diene monomer (EPDM) rubber or recycled rubber.

3. The aqueous textured layer forming composition as claimed in claim 1, wherein the solids weight ratio of the acrylic emulsion copolymer blend:vulcanized or crosslinked rubber granules ranges from 1:4.5 to 1:8.

4. The aqueous textured layer forming composition as claimed in claim 1, wherein the (iii) one or more polyalkylene oxides is a polyethylene oxide.

5. The aqueous textured layer forming composition as claimed in claim 1, wherein the (iv) one or more high boiling alcohols are chosen from hydroxyl group containing esters of $C_3$ to $C_8$ alkanoates, hydroxyl group containing alkyl esters of fatty acids, hydroxyl group containing alkyl ethers, $C_6$ to $C_{12}$ branched alkanols; or hydroxyl group containing fatty ethers.

6. The aqueous textured layer forming composition as claimed in claim 5, wherein at least one of the (iv) one or more high boiling alcohols is a hydroxyl group containing isobutyrate esters.

7. The aqueous textured layer forming composition as claimed in claim 1, wherein the amount of the (iv) one or more high boiling alcohols ranges from 0.5 to 10 wt. %, based on the total weight of the acrylic emulsion copolymer blend.

8. The aqueous textured layer forming composition as claimed in claim 1, wherein the composition further comprises a filler.

9. The aqueous textured layer forming composition as claimed in claim 8, wherein the filler comprises a silicate or an aluminum oxide.

10. A method of using an aqueous textured layer forming composition as claimed in claim 1, comprising applying the two-component aqueous textured layer forming composition to a substrate to form a layer as a top coat layer.

* * * * *